2,620,470

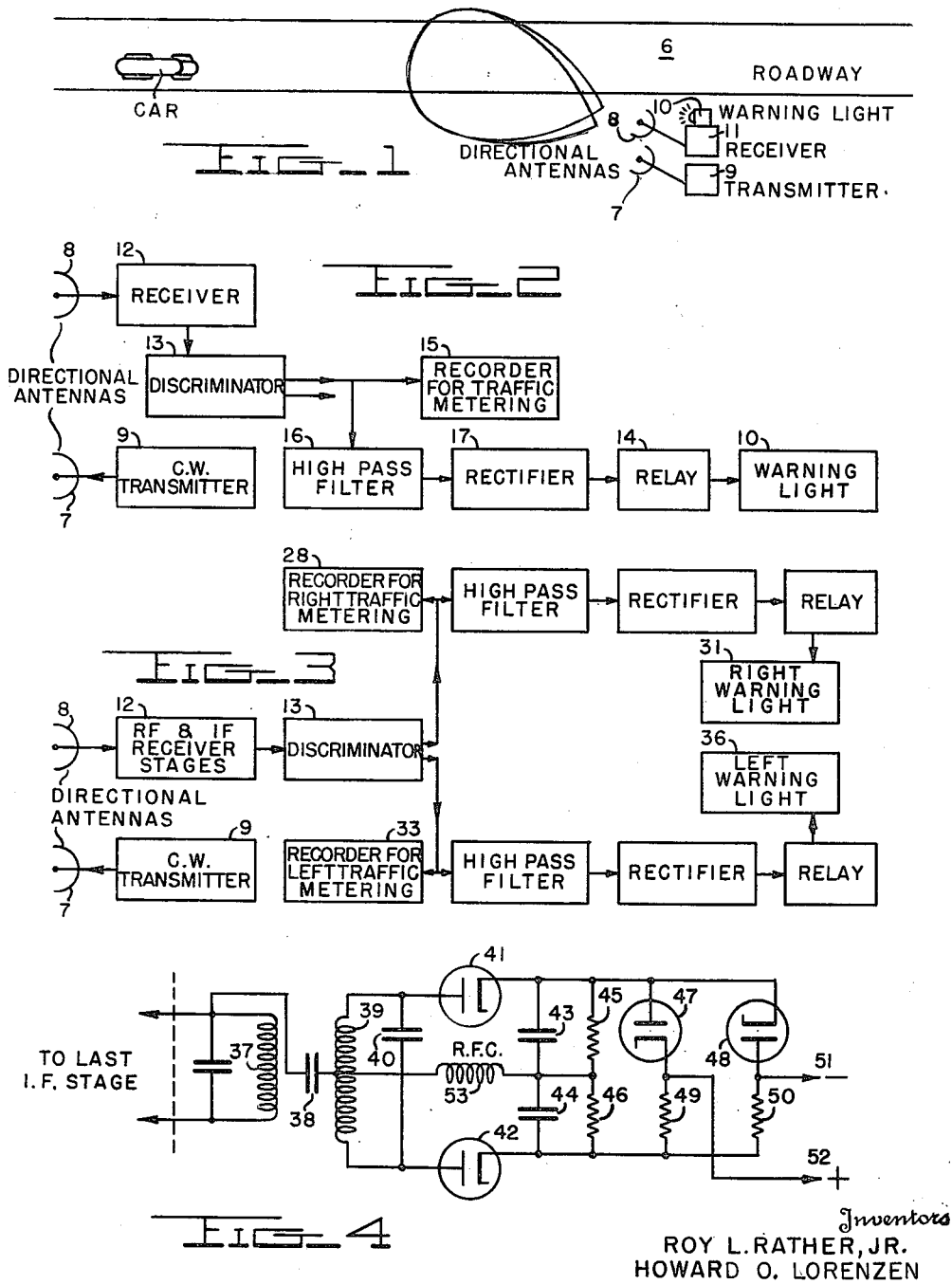
Dec. 2, 1952 — R. L. RATHER, JR., ET AL — 2,620,470
DOPPLER TRAFFIC CONTROL SYSTEM
Filed Sept. 13, 1946
Inventors
ROY L. RATHER, JR.
HOWARD O. LORENZEN Patented Dec. 2, 1952

UNITED STATES PATENT OFFICE 2,620,470

DOPPLER TRAFFIC CONTROL SYSTEM

Roy L. Rather, Jr., and Howard O. Lorenzen,
United States Navy, Washington, D. C.

Application September 13, 1946, Serial No. 696,965

6 Claims. (Cl. 343—9)

(Granted under the act of March 3, 1883, as
amended April 30, 1928; 370 O. G. 757)

This invention relates to systems for detecting and recording the motion of moving objects, and more particularly, to an electronic system employing the Doppler principle of frequency shifting and a novel frequency discriminator circuit adapted to provide an output signal characteristic of the direction and speed of moving objects.

The Doppler principle has been used in the past in various forms of moving target indicators, generally in conjunction with a radar system and one or more operators. These systems are particularly adapted to the detection of objects moving in the vicinity of numerous fixed objects such as planes flying low over mountainous terrain or ships in a harbor, and can even be used to detect objects moving on the ground in the presence of trees and other stationary objects which would obliterate a radar indicator. However, such systems are unsuitable to observe and record the speed and density of traffic along a section of highway. An operator would be required to distinguish the direction of traffic and his observations would not be satisfactory if there should be traffic in both directions simultaneously along the section of highway under surveillance. Nor could existing systems be used to automatically operate warning signals or traffic controlling devices for they do not discriminate as to the direction of motion of the reflecting object. It would be most advantageous to employ a simple apparatus, requiring no attendant or operator, that can be left in continuous operation for long periods.

It is therefore an object of this invention to provide an electronic traffic recording system which is sensitive to both speed and direction of traffic.

It is another object of this invention to provide an automatic traffic recording device, giving continuous operation for long periods of time without attention while maintaining a record showing the speed and direction of each vehicle as well as the density of traffic on the section of highway under surveillance.

It is another object of this invention to provide a simple, automatic, electronic traffic warning system capable of giving continuous operation for long periods of time without attention and which may be employed to flash a warning signal in the appropriate direction toward any vehicle moving in excess of a predetermined rate of speed.

It is still another object of this invention to provide a frequency discriminator arrangement that will isolate input signals having a frequency greater than a predetermined frequency from those having a frequency less than a predetermined frequency, producing each in separate output channels.

Other objects and advantages of the invention will be apparent from the following description and accompanying drawings, in which similar characters of reference indicate similar parts.

In the drawings:

Fig. 1 illustrates a plan view of a typical installation of this invention.

Fig. 2 is a block diagram of a simple embodiment of this invention.

Fig. 3 is a block diagram of still another embodiment of this invention.

Fig. 4 is a schematic diagram of the novel frequency detector used to determine the relative motion of a moving object.

Briefly, this invention uses the Doppler principle of frequency shifting to distinguish radiant energy reflected by a moving object from that reflected from a stationary object. It is well known that the carrier of a radio wave is shifted in frequency when reflected by a moving object in proportion to the relative velocity of said moving object. If the object is approaching, the carrier frequency is compressed by the reflecting object, that is, the period between consecutive cycles of the reflected signal appears shortened, and the reflected signal frequency is above the carrier and will produce a positive signal at the output of a frequency discriminator circuit. If the reflected signal is mixed with the carrier frequency, said positive output signal is amplitude modulated by the difference in frequency. Conversely, if the object is going away, the carrier frequency is expanded and the reflected signal frequency is below the carrier. Similarly, a negative output from the frequency discriminator will in this case be produced. However, if the system were simultaneously excited by reflected energy from one object approaching and another going away, the discriminator output would be confused and representative of neither reflected signal. To avoid this, the transmitter beam must cross the roadway at some angle, producing a relative motion of an object moving on the highway in respect to the transmitter which varies as the angle between them varies even if the object is travelling at a constant speed. This variation adds a frequency modulation to the frequency shift caused by motion of the reflecting object which is different for objects moving in opposite directions even if they have equal velocities. Then a pair of oppositely connected detectors fed by a conventional discriminator circuit will separate the positive signals responsive to approaching objects from the negative signals responsive to objects going away. The velocity of an object on the highway is a function of the frequency shift it imparts to the carrier. Thus appears the means for determining the presence, speed, and direction of traffic upon a highway; as is more fully explained below, this information may be used to automatically operate traffic signals, or may be automatically recorded as a means of compiling traffic statistics.

Referring now to the drawings in detail, Fig. 1 is a plan view showing how the invention might be located in respect to a roadway. As here shown, at the side of a roadway 6 a transmitter 9 is set up adjacent a receiver 11, each having a directional antenna 7 and 8 beamed in the same direction slantwise across said roadway. Located next to said receiver is a warning light 10 facing the left to right traffic on said roadway. The function of said light is to signal all traffic moving from left to right in excess of a predetermined speed. It should be noted that the directional antennas 7 and 8 are here shown pointed so that their beams will cross the roadway 6 rather than lie along it. It is advisable to keep the angle of intersection of the beam and the roadway as large as possible in order to improve the resolution of signals reflected when more than one vehicle is present. A limitation upon the largeness of this angle is imposed by its effect upon the relative motion of the traffic in respect to the antennas. However, the angle could be as large as 45° and still maintain a relative motion 70% of the actual velocity of the traffic.

To obtain separate responses from individual moving objects, no two going in the same direction should lie within the antenna beam simultaneously. Therefore, the portion of the antenna beam intersecting the road should be kept small. To accomplish this small intersection, at least one directional antenna having a narrow beam width should be used as well as a large angle of intersection. As shown in Fig. 1 the system would be used only against traffic approaching it from the left. If it were to also operate a warning light for traffic approaching from the right, a second warning light should be installed to the left of the intersection of the radio beam and the highway.

Fig. 2 is a block diagram of a simple embodiment of this invention employing a continuous wave transmitter 9 and having enough equipment to operate against only one direction of traffic. In this embodiment high frequency radio waves from a continuous wave transmitter 9 are beamed across a highway from a narrow beam antenna 7. A second narrow beam antenna 8 is suitably placed to point in the same direction as said transmitter antenna 7 and to have its beam intersect the highway at the same place. Thus the presence of a vehicle such as an automobile in the path of the transmitter beam will reflect radiant energy to said receiving antenna. As is well known in the art, this reflected energy will be shifted in frequency according to the velocity of the automobile. Because the line of motion of traffic on the highway is neither directly toward nor directly away from the transmitter, the amount of frequency shift will vary slightly as the angle of approach varies, producing frequency modulation in the reflected signal. The resultant signal and a portion of the transmitted energy which leaks into the receiver directly from the transmitter are applied to conventional receiver 12 and thence to a frequency discriminator circuit 13 which separates signals having a frequency greater than the transmitted signal from those having a frequency less than the transmitted signal as hereinafter described in detail in reference to Fig. 4. It will also be shown that the discriminator output will be amplitude modulated by the beat frequency of the transmitted and the reflected signal. The embodiment in Fig. 2, like that of Fig. 1 will be operated by only one direction of traffic, therefore, only one discriminator output is used, or in other words, only one sense of frequency shifting is used. This signal may be fed to a recording device 15 preferably of the type recording frequency against time. A suitable recording device would be one with a drum carrying a roll of paper revolving at a constant rate thus establishing the time axis and a stylus riding on the paper responsive to frequency so as to be deflected proportional to the frequency of the signal applied. This deflection could be calibrated in miles per hour thus providing means of recording the presence and speed of all traffic in one direction. The same output of said discriminator 13 may also be fed to a high pass filter 16 adjusted to pass beat frequencies, resulting from the above described action, above a certain level and thus only signals reflected from vehicles travelling at greater than a predetermined rate of speed. Now if those signals passed by said filter 16 are applied to a rectifier 17 and then a relay 14, which operates the warning light 10, said warning light can be made to light upon the approach of any vehicle travelling in excess of a predetermined speed.

A more economical embodiment of this invention than the one shown in Fig. 2, in the one illustrated in block diagram form in Fig. 3. This is a continuous wave system similar to Fig. 2 but utilizing both output channels of the discriminator 13 by connecting each output channel to a different warning light 31 and 36 and recorder 28 and 33, thus it can operate both directions of traffic. The system in Fig. 3 not only affords an economy of parts but also eliminates interference between transmitters if both directions of traffic were to be observed at the same point with two complete systems. The function and operation of the several components in Fig. 3 is the same as the corresponding parts in Fig. 2 which have been desired in connection therewith. It will be understood that the separate transmitting and receiving antennas 7 and 8 in Figs. 1, 2 and 3 could be replaced by a single horn.

Reference is now made to Fig. 4, which is a schematic diagram of a frequency discriminator circuit capable of separating input signals higher than a predetermined frequency and beating with it, from input signals lower than and beating with the same predetermined frequency, and to deliver these separated signals respectively into separate output channels. Said frequency discriminator circuit is preferably preceded by the R. F. and I. F. stages of a conventional receiver circuit, and as shown here, the last I. F. stage is loosely coupled to the discriminator input by a transformer whose primary 37 and secondary 39 form the inductive portion of two tuned circuits in the last I. F. stage and discriminator input respectively. One side of the primary 37 is coupled by a condenser 38 to the center tap of the secondary 39 to provide the required voltage and current phase relationship. The secondary 39 of the input transformer is adjusted to resonance by a shunting condenser 40 to the same frequency as the primary 37, which is of course the center frequency of the I. F. band. In series with each end tap from said secondary 39 is a diode 41 and 42. The plates of said diodes are tied to said end taps. Connecting the cathodes of said diodes 41 and 42 are a pair of series resistors 45 and 46, and in parallel with said resistors are a pair of series condensers 43 and 44, resistor 45 and condenser 43 being adjacent diode 41 and resistor 46 and condenser 44 adjacent diode 42. The midpoint of said series resistors is tied to the midpoint of said series condensers and said midpoints together are fed back to the center tap of the input transformer secondary 39 through a radio frequency choke 53. The voltages on the plates of said diodes are those induced in the secondary 39 of the input transformer, together with those developed across the grounded condenser 44 and fed back through the radio frequency choke 53. When the input signal is at its center or unmodulated frequency, such as a signal reflected from a stationary object, equal and opposite voltages are set up across the series resistors 45 and 46 and there is no output. When, however, the signal's frequency changes, one of the diodes' voltages lags behind the other. Thus, at a given moment in a cycle, the voltage on one of the diode plates is greater than that on the other. The output voltage is then the difference between the voltages across the two series resistors 45 and 46. The faithfulness with which the output voltage changes in strength with changes in input frequency is called the linearity of the detector. The series condensers 43 and 44 should have equal capacitances and the series resistors 45 and 46 should have equal resistances.

If the reflected signal is beat with the transmitter signal leaking to the receiver, the combined signal will be amplitude modulated by the difference frequency of the two. This amplitude modulation will be reflected in the voltage output across resistors 45 and 46. In the absence of a center frequency signal, an input signal above the center frequency would produce a positive constant voltage output and a signal below the center frequency, a negative voltage output. But with the input signal amplitude modulated by the aforesaid difference frequency, the output voltage will vary in amplitude according to said modulation but will retain the polarity determined by whether the reflected signal is above or below the center frequency.

Also connected in parallel across said series resistors is a diode 47 in series with a resistor 49. Said resistor 49 is on the ground side of said series circuit and said diode 47 is connected with its plate side away from ground. If the balance of voltage across the series resistors 45 and 46 is positive, said diode 47 will conduct and a positive voltage will be developed across resistance 49— this is the output channel 52 for one lane of traffic. Also in parallel across said series resistors 45 and 46 is another diode 48 and resistor 50 similarly connected except that the diode has its plate side toward ground. So if the balance of voltage across the series resistors 45 and 46 is negative, said diode 48 will conduct and the negative voltage will be developed across resistance 50—this is the other output channel 51 for the other lane of traffic. It should be noted that the pair of diodes 47 and 48 added to the output side of the discriminator circuit have a still more important function. If signals both above and below the center frequency should appear at the circuit simultaneously, their respective outputs would be neutralized to some extent across the resistors 45 and 46 and the output voltage would be unresponsive to either input signal. But if all incoming signals are frequency modulated as well as shifted from the carrier frequency, a signal above the carrier mixed with one below will produce a voltage wave having very complex transients embodying the particular characteristics of each which with the diode separating arrangement, are still distinguishable, at least when one is more predominant than the other. Frequency components of the signal above the carrier will be predominantly positive at the discriminator output and signals below the carrier predominantly negative. The diode 47 will see only the positive output voltages across resistors 45 and 46 and not the negative voltages tending to neutralize them. Conversely, the other diode 48 will see only the negative output voltages. By locating the transmitter beam at an angle with the roadway, frequency modulation will be provided. All traffic will have a line of motion which is neither directly toward nor directly away from the system's antennas. Hence, the relative motion of an object moving at constant velocity will have a relative motion which varies with the radial angle of the transmitter and the moving object. Since the amount of frequency shift is a function of the relative motion, the reflected signal will have a varying frequency shift, or in other words, frequency modulation. Thus, this arrangement permits separation of 2 pairs of simultaneously received signals beating below and above the center frequency, respectively.

The embodiments illustrated and described are for the purpose of disclosure. It will be understood that various modifications, particularly in the matter of details, may be resorted to without departing from the scope of the invention.

The invention described herein may be manufactured and used by or for the Government of the United States of America for governmental purposes without the payment of any royalties thereon or therefor.

What is claimed is:

1. A traffic control device, comprising a high frequency radiant energy transmitter of unmodulated continuous waves, a directional antenna means disposed to beam energy emitted from said transmitter at an angle across the roadway to be controlled, a high frequency radiant energy receiver adapted to receive both a direct transmission from said transmitter and energy reflected from objects in the field of radiation of said transmitter, a frequency discriminator circuit incorporated in said receiver as the detector element producing across its output terminals a direct current component responsive to the sense of the frequency shift of said reflected energy, a pair of oppositely poled rectifier means each having a series loading means connected across the output terminals of the frequency discriminator, an output channel terminal at the junction of each rectifier means and its respective loading means whereby signals responsive to one direction of traffic will appear at one output channel and signals responsive to the other direction of traffic at the other, and a pair of signalling means each connected to a different output channel and each rseponsive only to signals reflected from objects moving in a predetermined direction.

2. A traffic control device, comprising a high frequency radiant energy transmitter of unmodulated continuous waves, a directional antenna means disposed to beam energy emitted from said transmitter at an angle across the roadway to be controlled, a high frequency radiant energy receiver adapted to receive both a direct transmission from said transmitter and energy reflected from objects in the field of radiation of said transmitter, a frequency discriminator circuit incorporated in said receiver as the detector element producing across its output terminals a direct current component responsive to the sense of the frequency shift of the reflected energy, a pair of oppositely poled rectifier means each having a series loading means connected across the output terminals of the frequency discriminator, an output channel terminal at the junction of each rectifier means and its respective loading means whereby signals responsive to one direction of traffic will appear at one output channel and signals responsive to the other direction of traffic at the other, and a pair of traffic recording means each connected to a different output channel and each responsive only to signals reflected from objects moving in a predetermined direction.

3. A traffic control device, comprising a high frequency radiant energy transmitter of unmodulated continuous waves, a directional antenna means disposed to beam energy emitted from said transmitter at an angle across the roadway to be controlled, a receiver adapted to receive both a direct transmission from said transmitter and energy reflected from objects in the field of radiation of said transmitter, a frequency discriminator incorporated in said receiver as the detector element thereof, said discriminator producing at its output a direct current component responsive to the sense of the frequency shift of said reflected energy, a pair of signal transmission channels, a pair of rectifiers connected in opposite polarity between the discriminator output and said signal channels, each connecting one of said signal channels to the output of said discriminator.

4. A traffic control device, comprising a high frequency radiant energy transmitter of unmodulated continuous waves, a directional antenna means disposed to beam energy emitted from said transmitter at an angle across the roadway to be controlled, a high frequency radiant energy receiver adapted to receive both a direct transmission from said transmitter and energy reflected from objects in the field of radiation of said transmitter, a frequency discriminator circuit incorporated in said receiver as the detector element producing across its output terminals a direct current component responsive to the sense of the frequency shift of said reflected energy, a rectifier means having a series loading means connected across the output terminals of the frequency discriminator, an output channel terminal at the junction of said rectifier means and its series loading means whereby signals responsive to one direction of traffic will appear at said output channel, and a signalling means connected to said output channel and responsive only to signals reflected from objects moving in a predetermined direction.

5. A traffic control device, comprising a high frequency radiant energy transmitter of unmodulated continuous waves, a directional antenna means disposed to beam energy emitted from said transmitter at an angle across the roadway to be controlled, a high frequency radiant energy receiver adapted to receive both a direct transmission from said transmitter and energy reflected from objects in the field of radiation of said transmitter, a frequency discriminator circuit incorporated in said receiver as the detector element producing across its output terminals a direct current component responsive to the sense of the frequency shift of said reflected energy, a rectifier means having a series loading means connected across the output terminals of the frequency discriminator, an output channel terminal at the junction of said rectifier means and its series loading means whereby signals responsive to one direction of traffic will appear at said output channel, a high pass filter connected to said output channel, and a signalling means connected to said high pass filter and responsive only to signals reflected from objects moving in a predetermined direction and exceeding a predetermined speed.

6. A traffic control device, comprising a high frequency radiant energy transmitter of unmodulated continuous waves, a directional antenna means disposed to beam energy emitted from said transmitter at an angle across the roadway to be controlled, a high frequency radiant energy receiver adapted to receive both a direct transmission from said transmitter and energy reflected from objects in the field of radiation of said transmitter, a frequency discriminator circuit incorporated in said receiver as the detector element producing across its output terminals a direct current component responsive to the sense of the frequency shift of said reflected energy, a pair of oppositely poled rectifier means each having a series loading means connected across the output terminals of the frequency discriminator, an output channel terminal at the junction of each rectifier means and its reflected loading means whereby signals responsive to one direction of traffic will appear at one output channel, and signals responsive to the other direction of traffic at the other, a pair of high pass filters each connected to one of said output channels, and a pair of signalling means each connected to one of said high pass filters and each responsive only to signals reflected from objects moving in a predetermined direction and exceeding a predetermined speed.

ROY L. RATHER, JR.
HOWARD O. LORENZEN.

REFERENCES CITED

The following references are of record in the file of this patent:

UNITED STATES PATENTS

| Number | Name | Date |
| --- | --- | --- |
| 2,154,921 | Vroom | Apr. 18, 1939 |
| 2,193,361 | Rice | Mar. 12, 1940 |
| 2,229,640 | Crosby | Jan. 28, 1941 |
| 2,282,102 | Tunick | May 5, 1942 |
| 2,395,478 | Hansell | Feb. 26, 1946 |
| 2,402,464 | Suter | June 18, 1946 |
| 2,415,468 | Webb | Feb. 11, 1947 |
| 2,421,054 | Chapin | May 27, 1947 |
| 2,451,822 | Guanella | Oct. 19, 1948 |
| 2,477,567 | Barker | Aug. 2, 1949 |
| 2,524,702 | Hansell | Oct. 3, 1950 |